US005493862A

United States Patent [19]
Folsom

[11] Patent Number: 5,493,862
[45] Date of Patent: Feb. 27, 1996

[54] CONTINUOUSLY VARIABLE HYDROSTATIC TRANSMISSION

[75] Inventor: Lawrence R. Folsom, Pittsfield, Mass.

[73] Assignee: Martin Marietta Corporation, King of Prussia, Pa.

[21] Appl. No.: 333,688

[22] Filed: Nov. 3, 1994

[51] Int. Cl.⁶ .......................... F16D 31/02; F16D 39/00
[52] U.S. Cl. .................. 60/404; 60/408; 60/492; 92/12.2; 92/57; 92/71
[58] Field of Search .................. 60/487, 490, 491, 60/492, 404, 407, 408; 92/12.2, 57, 71; 91/505, 507; 417/269; 74/60

[56] References Cited

U.S. PATENT DOCUMENTS

| | | | |
|---|---|---|---|
| 1,407,047 | 2/1922 | Trowbridge | 60/492 |
| 2,770,099 | 11/1956 | Badalini | 60/492 |
| 2,788,636 | 4/1957 | Badalini | 60/492 |
| 3,204,411 | 9/1965 | Storkton | 60/492 |
| 4,574,904 | 3/1986 | Goode | 60/404 X |
| 4,710,107 | 12/1987 | Kanies | 417/269 |
| 4,731,997 | 3/1988 | Hagin | 60/487 X |
| 4,815,327 | 3/1989 | Drevet | 417/269 X |
| 5,269,142 | 12/1993 | Atake | 60/487 X |
| 5,423,183 | 6/1995 | Folsom | 60/492 |

*Primary Examiner*—Edward K. Look
*Assistant Examiner*—Hoang Nguyen
*Attorney, Agent, or Firm*—Robert A. Cahill; Geoffrey H. Krauss

[57] ABSTRACT

A continuously variable hydrostatic transmission includes an input shaft connected to drive a hydraulic pump unit, a grounded hydraulic motor unit, and an output shaft. A wedge-shaped swashplate is pivotally mounted to the output shaft in driving connection to receive output torque resulting from the exchange of pressurized hydraulic fluid between the pump and motor units through specially configured ports in the swashplate. A hydraulically actuated ratio controller is pivotally linked to the swashplate to selectively adjust the swashplate angle relative to the output shaft axis and thereby change transmission ratio.

20 Claims, 4 Drawing Sheets

CONTINUOUSLY VARIABLE HYDROSTATIC TRANSMISSION

FIELD OF THE INVENTION

The present invention relates to hydraulic machines and, more particularly, to hydrostatic transmissions capable of transmitting power from a prime mover to a load at continuously (infinitely) variable transmission ratios.

BACKGROUND OF THE INVENTION

In my copending U.S. patent application Ser. No. 08/093,192, filed Jul. 13, 1993, the disclosure of which is incorporated herein by reference, a hydraulic machine is disclosed and claimed as including a hydraulic pump unit and a hydraulic motor unit positioned in opposed, axially aligned relation with an intermediate, wedge-shaped swashplate. The pump unit is connected to an input shaft driven by a prime mover, while the motor unit is grounded to the stationary machine housing. An output shaft, coaxial with the input shaft and drivingly coupled to a load, is connected to the swashplate. When the pump unit is driven by the prime mover, hydraulic fluid is pumped back and forth between the pump and motor units through specially configured ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a pure hydrostatic component resulting from the differential forces created by the fluid pressures acting on circumferentially opposed end surfaces of the swashplate ports, which are of different surface areas due to the wedged shape of the swashplate.

To change transmission ratio, the angular orientation of the swashplate relative to the axis of the output shaft is varied. Since the transmission ratio, i.e., speed ratio, is continuously variable between 1:0 and 1:1, the prime mover can run at a constant speed set essentially at its most efficient operating point. The availability of a 1:0 (neutral) transmission ratio setting eliminates the need for a clutch. Unlike conventional, continuously variable hydrostatic transmissions, wherein hydraulic fluid flow rate increases proportionately with increasing transmission ratio such that maximum flow rate occurs at the highest transmission ratio setting, the flow rate in the hydraulic machine disclosed in my cited U.S. application reaches a maximum at a midpoint in the ratio range and then progressively decreases to essentially zero at the highest transmission ratio setting. Thus, losses due to hydraulic fluid flow are reduced, and the annoying whine of conventional hydrostatic transmissions at high ratios is avoided. By virtue of the multiple torque components exerted on the swashplate, the decreasing hydraulic fluid flow in the upper half of the output speed range, and the capability of accommodating an optimum performance prime mover input, the hydraulic machine of my U.S. application has a particularly advantageous application as a highly efficient, quiet, continuously variable hydrostatic transmission in vehicular drive trains.

SUMMARY OF THE INVENTION

An objective of the present invention is to provide improvements in the hydraulic machine of my U.S. application Ser. No. 08/093,192, to achieve economies in size, parts count and manufacturing cost.

A further objective of the present invention is to provide improvements in the manner in which low pressure makeup hydraulic fluid is introduced to the hydraulic pump and motor units and the manner in which hydraulic fluid pressure is made available for adjusting transmission ratio, i.e., adjustment of swashplate angle.

An additional objective of the present invention is to provide a hydraulic machine of the type disclosed in my U.S. application, wherein energy can be stored while the hydraulic machine is driven by a prime mover for subsequent recovery and use to temporarily drive the output shaft, the input shaft, or both input and output shafts, depending upon swashplate angle.

Another objective of the present invention is to provide an improved hydrostatic bearing capable of handling extreme thrust loadings developed in hydraulic machines.

To achieve these objectives, the hydraulic machine of the present invention, in its application as a continuously variable hydrostatic transmission, comprises a housing; an input shaft journaled in the housing for receiving input torque from a prime mover; an output shaft journaled in housing from imparting driving torque to a load; a hydraulic pump unit coupled to the input shaft; a hydraulic motor unit grounded to the housing; a wedge-shaped swashplate including ports extending between an input face confronting the pump unit and an output face confronting the motor unit; a coupling drivingly connected to the output shaft and pivotally connected to the swashplate to accommodate both torque transfer between the output shaft and the swashplate and adjustment of the swashplate angle relative to the output shaft axis; a controller coupled to adjust the swashplate angle to a desired transmission drive ratio; and an axially extending, internal passage in one of the input and output shafts for introducing hydraulic fluid to the pump and motor units.

Further in accordance with these objectives, the present invention provides a hydraulic machine comprising a housing; an input shaft journaled in the housing for receiving input torque from a prime mover; an output shaft journaled in the housing for imparting torque to a load; a hydraulic pump unit coupled to the input shaft; a hydraulic motor unit grounded to the housing; a wedge-shaped swashplate drivingly coupled to the output shaft and including ports extending between an input face confronting the pump unit and an output face confronting the motor unit; a controller linked to the swashplate for adjusting the angular orientation of the swashplate relative to the output shaft axis; a valve having a storing position and a recovery position; and a hydraulic fluid accumulator in hydraulic fluid flow communication with the pump and motor units through the valve for storing energy during propulsion of the pump unit by the prime mover while the valve is in the storing position and for recovering energy back to the pump and motor units while the valve is in the recovery position, such as to drive the input shaft, the output shaft, or both the input shaft and the output shafts, depending upon swashplate angle.

Further in accordance with these objectives, the present invention provides a hydraulic machine comprising a housing; an input shaft journaled in the housing for receiving input torque, a hydraulic pump unit driven by the input shaft and including a cylinder and a piston for pressurizing hydraulic fluid in the cylinder; and a hydrostatic thrust bearing including a first bearing member affixed to the hydraulic machine and having a first bearing surface, a second bearing member affixed to a moving part of the machine and having a second bearing surface in sliding contact with the first bearing surface at an interface, at least one cavity formed in one of the first and second bearing surfaces at the interface, and an opening into the cavity in flow communication with the cylinder through which hydraulic fluid is introduced from the cylinder to fill the cavity and through which the hydraulic fluid in the cavity is pressurized from the pressurized hydraulic fluid in the cylinder to generate thrust forces proportional to a surface area of the cavity in opposition to thrust loadings generated by the machine.

Additional features, advantages, and objectives of the invention will be set forth in the description which follows and in part will be apparent from the description, or may be learned by practice of the invention. The objectives and advantages of the present invention will be realized and attained by the apparatus particularly pointed out in the following written description and the appended claims, as well as in the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention and, together with the description, serve to explain the principles of the invention.

BRIEF DESCRIPTION OF THE DRAWINGS

Corresponding reference numerals refer to like parts throughout the several views of the drawings.

DETAILED DESCRIPTION OF THE PREFERRED EMBODIMENT

Figure 1:
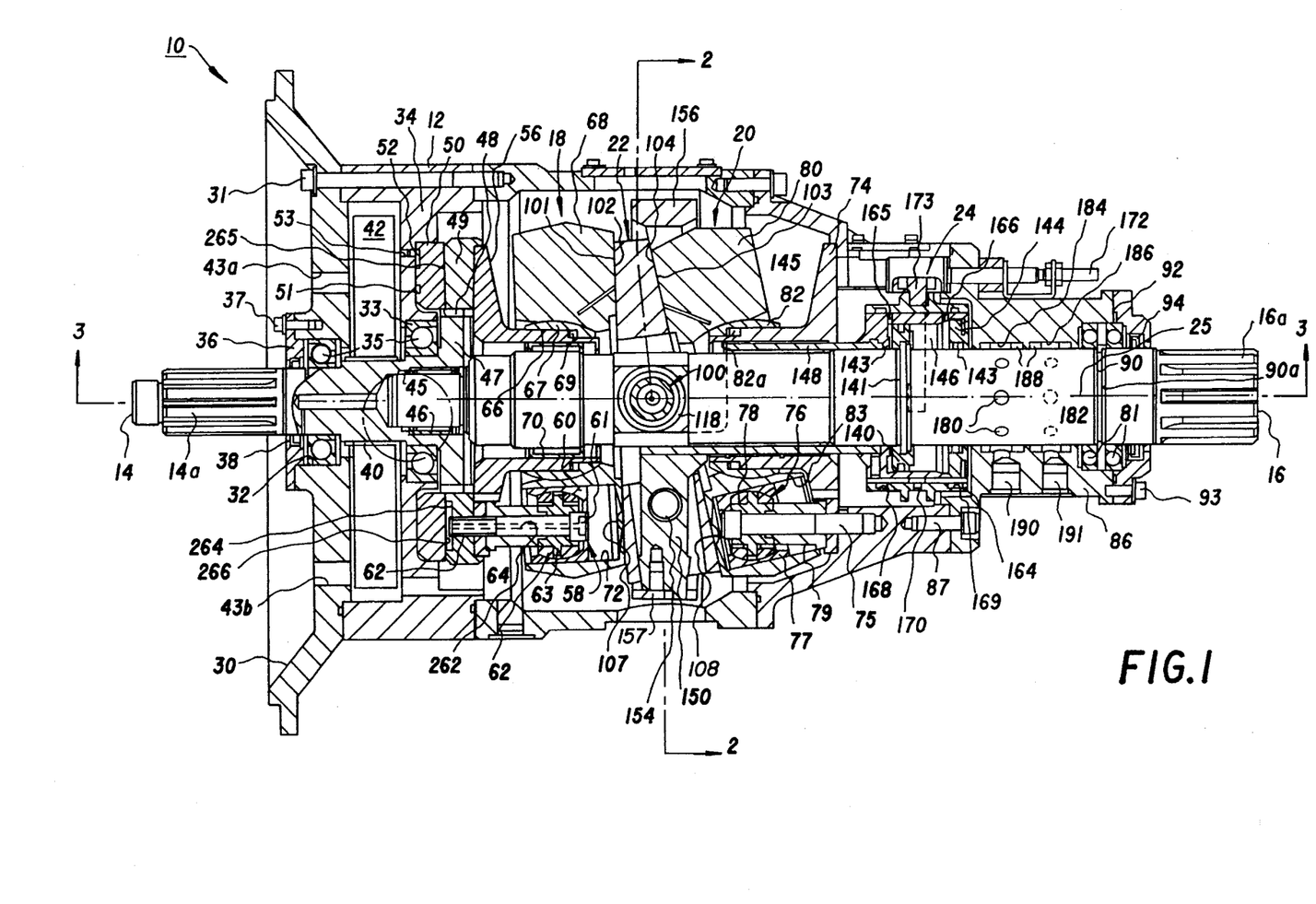
FIG. 1 is a longitudinal sectional view of a continuously variable hydrostatic transmission in accordance with the present invention.

The continuously variable hydrostatic transmission according to the preferred embodiment of the present invention, generally indicated at 10 in FIG. 1, comprises, as basic components, a housing 12 in which are journaled an input shaft 14 and an output shaft 16 in coaxial, generally end-to-end relation. The end of input shaft 14 external to the housing is splined, as indicated at 14a, to facilitate driving connection to a prime mover (not shown), while the end of output shaft 16 external to the housing is splined, as indicated at 16a, to facilitate driving connection to a load (not shown). Input shaft 14 drives a hydraulic pump unit, generally indicated at 18. A hydraulic motor unit, generally indicated at 20, is grounded to housing 12 in axially opposed relation to pump unit 18. A wedge-shaped swashplate, generally indicated at 22, is drivingly connected to the output shaft 16 in a position between the pump and motor units and is ported to provide for the exchange of hydraulic fluid between the pump and motor units. A controller, generally indicated at 24, is linked to the swashplate 22 for the purpose of pivotally adjusting the angle of swashplate orientation relative to the output shaft axis 25, thereby setting the transmission ratio of the input shaft speed to the output shaft speed.

Now referring to FIG. 1 in greater detail, the cylindrical housing 12 includes a cover 30 secured in place by an annular array of bolts, one seen at 31, to close off the open input end of the housing. Input shaft 14 extends into housing 12 through a central opening 32 in the cover and a central opening 33 in a housing partition 34. Bearings 35, fitted in cover opening 32 and partition opening 33 journal the input shaft 14 for rotation. An annular end cap 36, affixed to cover 30 by bolts 37, holds a seal 38 against the input shaft peripheral surface to prevent leakage of hydraulic fluid.

Figure 4:
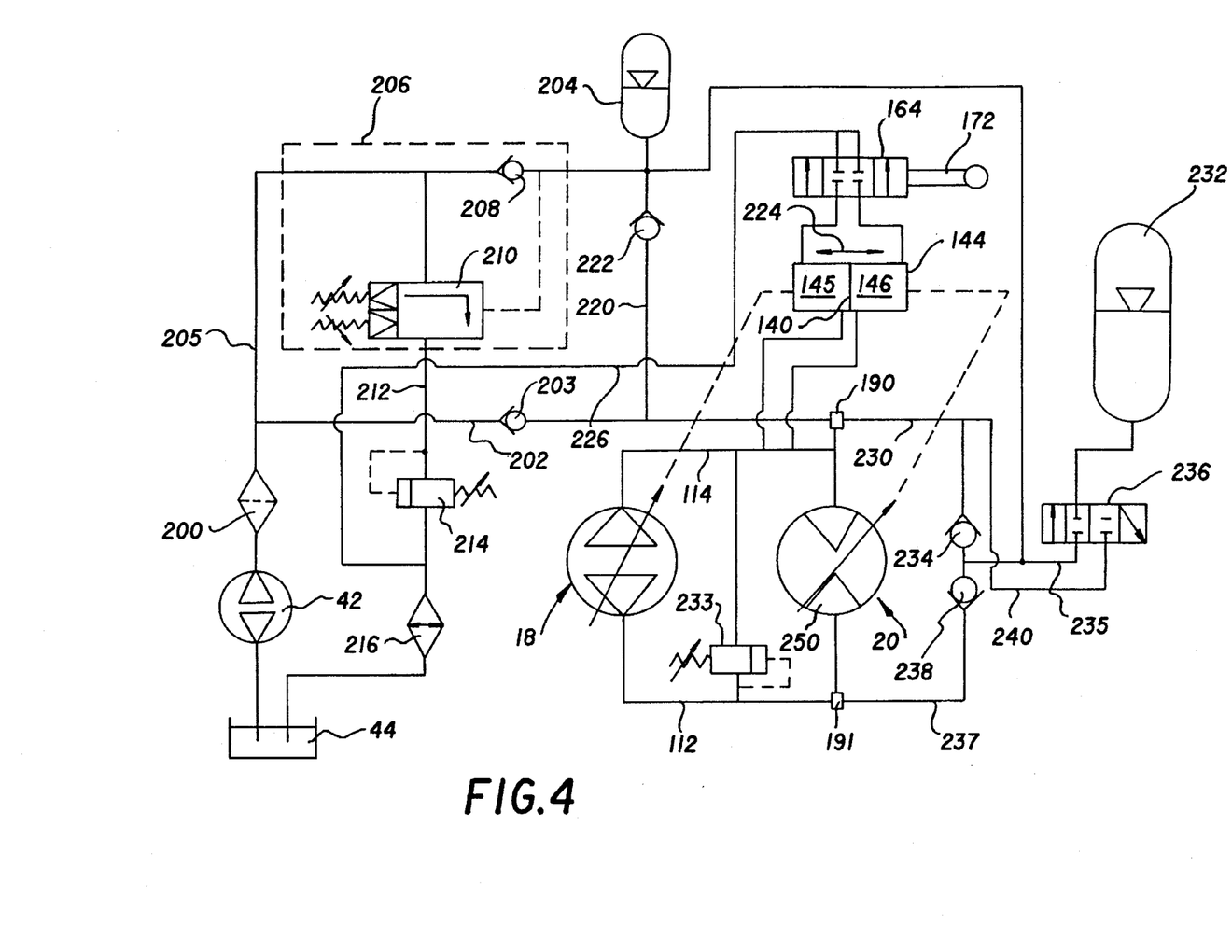
FIG. 4 is a schematic diagram of a hydraulic circuit incorporating the transmission of FIG. 1.

The axial section of the input shaft between cover 30 and housing partition 34 is splined, as indicated at 40, to facilitate driving connection with a scavenge pump, diagrammatically indicated at 42 in FIG. 1 and also in FIG. 4. Inlet and outlet ports 43a and 43b, illustrated for the sake of drawing convenience as being formed in cover 30, provide for fluid connection of scavenge pump 42 into the hydraulic circuit of FIG. 4 to pump hydraulic fluid from a sump. While sump 44 is illustrated in FIG. 4 as being external to housing 12, it will be appreciated that the sump may be provided in an expanded lower pan portion (not shown in FIG. 1) of the housing.

Returning to FIG. 1, the inner end of input shaft 14 is counterbored to provide a cylindrical recess 45 for receiving a reduced diameter inner terminal portion of output shaft 16. Bearings 46, fitted in recess 45, provide inner end journal support for the output shaft. The inner terminal portion of input shaft 14 beyond housing partition 34 is flared to provide a radial flange 47 having a splined peripheral surface in meshed engagement with a splined central bore (commonly indicated at 48) of an annular thrust washer 49. An annular wear plate 50, fitted in an annular recess 51 in the inner face of housing partition 34 and keyed against rotation by a headed pin 52 inserted in a hole 53 drilled in the housing partition, cooperates with thrust washer 49 in a manner described later to effectively handle the extreme thrust loadings developed in transmission 10.

The inner radial end face of thrust washer 49 is recessed to receive the radially flared left end portion of a carrier 56 for a plurality of pistons included in hydraulic pump unit 18. These pistons, for example, ten in number with one being generally indicated at 58, are uniformly distributed in a circular array concentric with output shaft axis 25 in the manner disclosed in my U.S. application. As illustrated in FIG. 1 herein, each pump piston 58 includes a piston head 60 mounted to the piston carrier 56 by an elongated bolt 61 extending through a hole in the piston carrier and threaded into a tapped hole in thrust washer 49, as indicated at 62. Piston head 60 is machined to provide a spherical inner surface conforming to a spherical outer surface of an annular bearing 62 keyed on an inner bushing 63 carried by bolt 61. A standoff sleeve 64 is also carried by bolt 61 such that, when the bolt is tightened down, the spherical bearing is clamped in place to appropriately position piston head 60 in axially spaced relation to piston carrier 56. As a result, each piston head 60 is mounted for limited radial and swiveling motion as in the case of the hydraulic machine disclosed in my cited PCT application.

The cylindrical right end portion of pump piston carrier 56 carries an annular spherical bearing 66 conforming to a spherical surface 67 machined in the central opening of an annular pump cylinder block 68. Compression springs 69 acting against opposed shoulders provided on carrier 56 and spherical bearing 66 urge the spherical bearing rightward toward the output end of transmission. A bearing 70 is confined in the central opening of pump piston carrier 56, through which output shaft 16 extends, to provide further journal support for pump piston carrier 56. Cylinder block 68 includes an annular array of pump cylinders 72 for respectively receiving the pump pistons 58. By virtue of the spherical bearing mountings of pump piston heads 60 and pump cylinder block 68, precessing motion of the pump cylinder block rotational axis is accommodated.

Still referring to FIG. 1, hydraulic motor unit 20 is essentially structurally equivalent to hydraulic pump unit 18. However, an annular motor piston carrier 74, equivalent to rotating pump piston carrier 56, is instead grounded to housing 12 by an annular array of bolts 75. These bolts also serve to mount motor pistons, generally indicated at 76, each including a piston head 77 swivel mounted on a spherical bearing 78 positioned in standoff relation to pump piston carrier 74 by a sleeve 79 in the same manner as pump pistons 58. A motor cylinder block 80 is then swivel mounted on carrier 74 via an annular spherical bearing 82. Compression springs 82a urge spherical bearing 82 leftward toward the input end of transmission 10. Again, as in the case of pump cylinder block 68, a circular array of motor cylinders 83 are formed in cylinder block 80 to respectively receive motor pistons 76. Since motor unit 20 is grounded to housing 12 by bolts 75, the motor pistons 76 and cylinder block 80 do not rotate, however, the spherical bearing mountings of motor piston heads 77 to bolts 75 and motor cylinder block 80 to carrier 74 accommodate nutating (precessing) motion of the motor cylinder block axis.

As further seen in FIG. 1, output shaft 16 extends rightwardly through the central opening in carrier 74 and out of housing 12 through a central opening in a hub-shaped output end closure 86 affixed to housing 12 by bolts, one seen at 87. A pair of ring bearings 89, recessed in the end closure central opening in flanking relation with a C-clip 90 captured in an annular groove 90a formed in the output shaft periphery, provide journal support for the output shaft just prior to exiting housing 12. An annular end cap 92, affixed to end closure 86 by bolts 93, confines a seal 94 against the surface of output shaft 16 at the point of final exit from the housing to prevent leakage of hydraulic fluid.

Swashplate 22 is drivingly connected to output shaft 16 by a coupling, generally indicated at 100 in FIG. 1, in operative position between pump unit 18 and motor unit 20. Swashplate 22 includes an input face 101 in intimate sliding contact with face 102 of pump cylinder block 68 and an output face 103 in intimate sliding contact with face 104 of motor cylinder block 80. The input and output faces of swashplate 22 are relatively oriented at an acute angle to provide the wedged shape of the swashplate. Kidney-shaped ports 106, seen in FIG. 2, extend between the input and output faces of the swashplate and communicate with respective openings 107 into cylinders 72 of pump cylinder block 68 and respective openings 108 into the cylinders 83 in motor cylinder block 80, all as more fully described and illustrated in my cited U.S. application.

Figure 2:
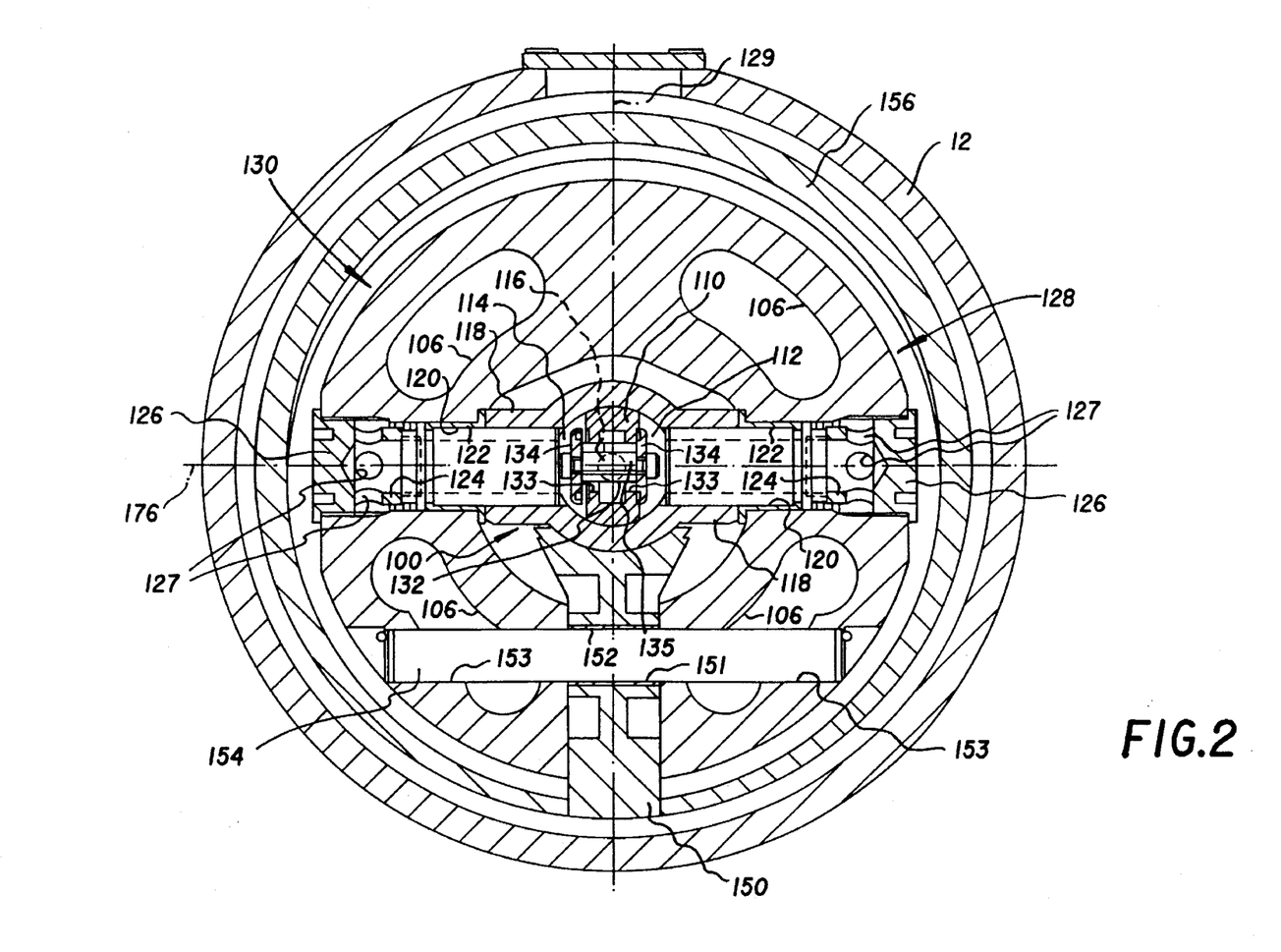
FIG. 2 is a sectional view taken along line 2—2 of FIG. 1.
Figure 3:
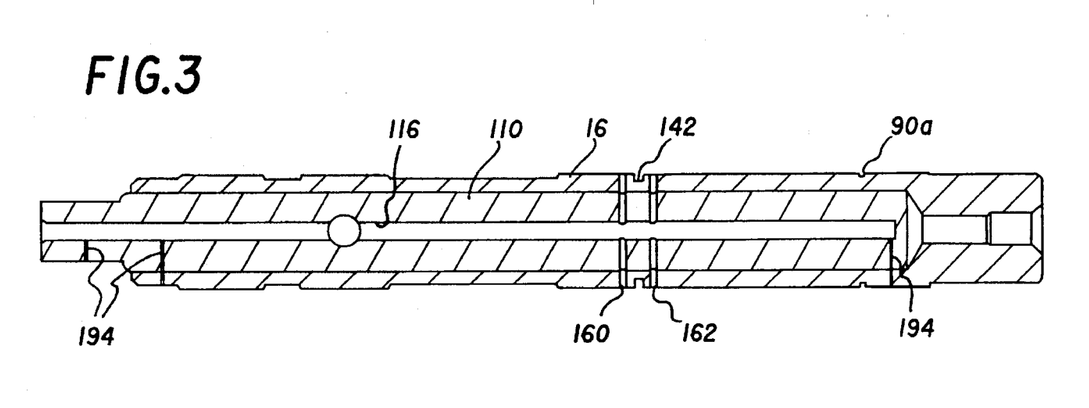
FIG. 3 is a longitudinal sectional view of the output shaft in FIG. 1, taken along line 3—3.

Output shaft 16 is in the form of a hollow shaft into which is inserted a partition 110 to provide a pair of side-by-side, axially elongated hydraulic fluid passages 112 and 114, as seen in FIGS. 2 and 3. A blind central bore 116 is formed in partition 110 extending from the left end to just short of the right end of the partition, as seen in FIG. 3. Returning to FIG. 2, coupling 100, which pivotally, drivingly connects swashplate 22 to output shaft 16, includes a pair of diametrically opposed hubs 118 provided on the output shaft in radially outwardly extending relation. The inner end of one hub opens into internal shaft passage 112, while the inner end of the other hub opens into internal shaft passage 114. Diametrically opposed, radial bores 120, are drilled in swashplate 22, into which flanged bushing sleeves 122 are inserted. Hollow drive pins 124 are then inserted through the swashplate bores and bushing sleeves 122 into shaft hubs 118 to pivotally and drivingly connect swashplate 22 to the output shaft. Plugs 126 are threaded into tapped outer end portions of swashplate bores 120 to seal off their outer ends and to capture drive pins 124 in place. Radial bores 127 are drilled through the tubular wall of each drive pin adjacent its outer end to provide hydraulic flow communication from a high pressure side 128 of swashplate 22 (to the right of diametrical line 129) to internal shaft passage 112 and from a low pressure side 130 of the swashplate (to the left of line 129) to internal shaft passage 114. A shuttle valve, generally indicated at 132, is installed in opposed, enlarged side openings 133 in shaft partition 110 communicating with partition bore 116. This shuttle valve includes a pair of valve plates 134 captured in spaced relation by a shouldered, interconnecting pin 135. Consequently, the valve plate 134, exposed to the high pressure side 128 of swashplate 22, is pressed against partition 110 to seal off one partition opening 133, while the other valve plate 134 is spaced from partition 110 to open the other partition opening 133 to the low pressure side 130 of the swashplate 22, thereby allowing low pressure hydraulic fluid to flow into a partition bore 116. Shuttle valve 132 thus ensures that only low pressure hydraulic fluid can flow into partition bore 116.

Returning to FIG. 1, ratio controller 24 comprises an annular piston 140 carried on output shaft 16 at an axial position fixed by a split collar 141 captured in an annular groove 142 (FIG. 3) cut into the output shaft periphery. Slidingly mounted on the output shaft in sealing relation, provided by seals 143, is an annular control cylinder 144 encompassing piston 140 to provide a sealed chamber 145 to the left of piston 140 and a sealed chamber 146 to the right of the piston. A control sleeve 148, surrounding output shaft 16, is affixed at its outer end to control cylinder 144 and extends towards swashplate 22 through the clearance between motor unit carrier 74 and the output shaft. Affixed to the inner end of control sleeve 148 is a radially outwardly extending tang 150. As best seen in FIG. 2, at a location radially spaced from the output shaft 16, a transverse bore 151 is drilled through tang 150 and is lined with a bushing 152. Aligned transverse bores 153 are also drilled through an axially thickened rim of swashplate 22. A pivot pin 154 is then inserted through bores 153 and tang bushing 152 to the position shown in FIG. 2, so as to pivotally connect swashplate 22 to tang 150.

As seen in FIGS. 1 and 2, a balance ring 156 is attached to the outer end of tang 150 by a bolt 157. As fully explained in my cited U.S. application, a counterweight, such as provided by balance ring 156, is utilized to counterbalance the eccentric masses of the swashplate 22, and the precessing pump cylinder block 68 and motor cylinder block 80.

Returning to the description of ratio controller 24, as seen in FIG. 3, a pair of radial holes 160 and 162 are drilled through the tubular wall of output shaft 16 and shaft partition 110 to intersect with partition bore 116. The axial locations of holes 160 and 162 are in close flanking relation with annular groove 142 fixing the position of control piston 140 (FIG. 1), and thus are on opposite sides of the control piston. Consequently, control cylinder chamber 145 is in communication with the low pressure hydraulic fluid in partition bore 116 through hole 160, and control cylinder chamber 146 is in communication with the low pressure hydraulic fluid in partition bore 116 through hole 162. Returning to FIG. 1, a cylindrical control valve member 164 surrounds control cylinder 144 in sealed relation with the peripheral surface of the control cylinder. Vent holes 165 and 166 are drilled through the tubular wall of control cylinder 144 at extreme axial locations, such that vent hole 165 communicates with control cylinder chamber 145, while vent hole 166 communicates with control cylinder chamber 146. Except during ratio changes, vent holes 165 and 166 are blocked by a control valve member 164.

The inner surface of valve member 164 is machined with a pair of annular cavities 168 and 169 at extreme axial locations. Since the ratio controller components are seen to rotate in unison with swashplate 22 and output shaft 16, the outer peripheral surface of control valve member 164 is provided with a pair of axially spaced, annular ribs to define a continuous annular groove 170. A control rod 172, mounted by housing 12 for sliding axial movement, is equipped with a radially inwardly projecting finger 173, which is engaged in the valve member annular groove 170.

As noted above, during steady speed operation, control valve member 164 of controller 24 assumes an axial position to seal off vent holes 165 and 166 in control cylinder 144. Consequently, both control cylinder chambers 145 and 146 are filled with hydraulic fluid at the same pressure via partition bore 116 and poles 160 and 162. Thus, the axial position of control cylinder 144 is held steady by the balanced hydraulic fluid pressures in chambers 145 and 146 to set a particular transmission ratio according to the established angular orientation of swashplate 22. To change transmission ratio, the axial position of control valve member 164 relative to control cylinder 144 is shifted to communicate one of the annular grooves 168, 169 with a corresponding one of the control cylinder vent holes 165, 166. Hydraulic fluid then flows from the vented control cylinder chamber through the unblocked vent hole into the associated annular cavity in control valve member 164. The vented hydraulic fluid is recovered in the hydraulic circuit of FIG. 4, into which the annular cavities 168 and 169 are ported. As a result of the pressure imbalance created in control cylinder chambers 145 and 146, the axial position of the control cylinder 144 is shifted, causing pivotal angular adjustment of the swashplate angle via the controller linkage including control sleeve 148 and tang 150.

Since the shifted axial position of control valve member 164 is held by the engagement of control rod finger 173 in annular groove 170, the control valve member does not follow the axial movement of control cylinder 144. Ultimately, the control cylinder reaches an axial position where the vented one of the vent holes 145 or 146 is sealed off by control valve member 164. The hydraulic fluid pressures in the control cylinder chambers 145 and 145 quickly equalize to hold the shifted axial position of the control cylinder and thus the new swashplate angle.

Considering the controller and swashplate positions illustrated in FIG. 1, when control valve member 164 is actually shifted leftward, vent hole 166 is opened to annular cavity 169. Hydraulic fluid is then vented from control cylinder chamber 146, as hydraulic fluid flows into control cylinder chamber 145 via partition bore 116 and hole 160, causing a pressure imbalance. The volume of control cylinder chamber 145 expands as the volume of control cylinder chamber 146 contracts, driving control cylinder 144 leftward. Swashplate 22 is thus pivoted in the counterclockwise direction about a transverse axis 176 (FIG. 2), intersecting the output shaft axis 25, as established by coupling 100.

When control cylinder 144 achieves an axial position where vent hole 166 is sealed off by control valve member 164, the hydraulic pressures in control cylinder chambers 145 and 146 equalize to set the transmission ratio according to the new swashplate angle.

Concluding the description of transmission 10 seen in FIG. 1, a first set of circumferentially spaced holes 180 are drilled through the tubular wall of output shaft 16 into communication with the low pressure internal shaft passage 114, while a second set of circumferentially spaced holes 122 (illustrated in phantom at axially displaced positions from holes 180 on the far side of the output shaft) are drilled through the tubular wall of output shaft 16 into communication with the high pressure internal shaft passage 112. A pair of annular cavities 184 and 186 are machined in the bore surface of end closure 86. Annular cavity 184 is radially aligned with the set of holes 180, while annular cavity 186 is radially aligned with the set of holes 182. Fluid leakage from these annular cavities is prevented by annular seals 188. Ports 190 and 191 in end closure 86 communicate with annular cavities 184 and 186, respectively.

Since a detailed description of the operation of transmission 10 may be had by reference to my cited U.S. application, the operating description is merely summarized herein for the sake of brevity. When torque is applied to input shaft 14 by a prime mover, scavenge pump 42 is driven along with pump unit 18 to introduce makeup fluid into the pump and motor cylinders 72 and 83 via port 190, holes 180, and internal shaft passage 114. As seen in FIG. 3, small radial holes 194 are drilled into partition bore 116, such that hydraulic fluid is distributed to the various shaft bearings for lubrication purposes. With the angular position of swashplate 22 illustrated in FIG. 1, its input face 101 is essentially perpendicular to output shaft axis 25. Pump cylinder block 68 thus turns in a circular path with no axial component of motion, and therefore no pumping of hydraulic fluid occurs. This is the neutral setting of the transmission ratio.

When it is desired to apply torque to a load connected to output shaft 16, control rod 172 is shifted leftward, resulting in counterclockwise pivotal adjustment of the swashplate in the manner described above, and the rotational axis of the swashplate precesses to a new setting. With the input face 101 of swashplate 22 now at an oblique angle relative to output shaft axis 25, rotation of the pump cylinder block 68 is now about a precessed axis angularly offset from output shaft axis 25. Note that the rotational axis of motor cylinder block 80 also precesses to a new setting dictated by the swashplate output face 103. The pump cylinders 72 thus reciprocate axially with respect to pump pistons 58, thereby pressurizing the hydraulic fluid in the pump cylinders and pumping the pressurized fluid through the kidney-shaped slots 106. The torque exerted on the input face 101 of swashplate 22 by the rotating face of pump cylinder block 68 constitutes a mechanical component of the input torque delivered to output shaft 16 via the swashplate. This mechanical torque component is essentially zero when the input face 101 of the swashplate is perpendicular to the output shaft axis 25 and gradually increases to 100% of the output torque when the output face 103 of the swashplate is perpendicular to axis 25. This is because, with the output face of the swashplate perpendicular to the output shaft axis, there is no pumping action of the motor pistons 76 in motor cylinders 83 and thus no fluid output from motor unit 20. Consequently, pump unit 18 and swashplate 22 are essentially locked up hydraulically with no relative movement between the rotating pump cylinder block 68 and swashplate 22. Therefore, the transmission ratio is 1:1 with a straight through mechanical transmission of torque from the input shaft 14 to the output shaft 16.

At intermediate angles of the swashplate 22, the hydraulic fluid pressurized by pump unit 18 is pumped through the kidney-shaped slots 106 in the swashplate to pressurize motor cylinders 83 in motor cylinder block 80. The pressurized fluid in motor cylinders 83 exerts an axial force against the inner, axially facing surfaces of the motor cylinder block 80, which is in turn exerted on the output face 103 of swashplate 22. A torque component is thus imparted to the swashplate which is approximately equal to the tangent of the angle of the swashplate relative to the output shaft axis times the axial force exerted by motor cylinder block 80 on the swashplate 22.

A third component of torque exerted on the swashplate 22 is a pure hydrostatic component and is a function of the differential forces created by the hydraulic pressures exerted on the circumferentially opposed end surfaces of the kidney-shaped slots 106, which, as noted above, are of different areas. This third torque component constitutes about 85% of the torque transmitted through transmission 10 at intermediate transmission ratios between neutral and 1:1.

It will be appreciated that, at transmission ratios other than neutral, while the pump cylinders 72 are rotating in the "uphill" direction from the thinnest point of swashplate 22 to the thickest point, hydraulic fluid in these cylinders is being compressed and thus pressurized. Consequently, this is the high pressure side of the swashplate indicated at 128 in FIG. 2. Then, on the diametrically opposite side of the swashplate, pump cylinders 72 rotate in the "downhill" direction from the thickest point of the swashplate to the thinnest point. This then is the suction or low pressure side of swashplate 22, as indicated at 130 in FIG. 2, during which hydraulic fluid is transferred back to the pump cylinders 72 from the motor cylinders 83 through the swashplate slots 106.

Turning to the hydraulic circuit of FIG. 4, hydraulic fluid is pumped from sump 44 by scavenge pump 42 through a filter 200, a fluid line 202 and a check valve 203 to port 90 in end closure 86, through which low pressure makeup hydraulic fluid is introduced to the pump unit 18 and the motor unit 20 via internal shaft passage 114, as long as the pump output pressure exceeds the pressure at low pressure port 190. A small energy storage accumulator 204 is charged by the scavenge pump output from filter 200 through a fluid line 205 and a charging valve, generally indicated at 206. This charging valve includes a check valve 208 which opens to feed hydraulic fluid into accumulator 204, unless the accumulator pressure exceeds the pump output pressure. In this case, an adjustable pressure relief valve 210 opens and hydraulic fluid in line 205 is diverted to a return fluid line 212 leading back to sump 44 through a second pressure relief valve 214 and a cooler 216. Pressure relief valve 214 acts to reduce the pressure in fluid line 205, when diverted to fluid line 212, to allow scavenge pump 42 to run at low pressure and feed the lubrication lines and low pressure internal shaft passage 114 via fluid line 202.

Accumulator 204 serves the purpose of storing energy to ensure that adequate hydraulic pressure is always available to operate ratio controller 24 in the absence of adequate hydraulic fluid pressure at the output of scavenge pump 42. Thus, accumulator 204 is connected through a fluid line 220 and a check valve 222 to port 190. Hydraulic pressure is thus available to change transmission ratio in case the prime mover ceases to apply input torque to input shaft 14.

Reference numerals 164 and 172 in FIG. 4 schematically represent the like-referenced control valve member and control rod, respectively, of ratio controller 24 in FIG. 1. Similarly, reference numerals 140, 144, 145, and 146 in FIG. 4 schematically represent the like-referenced control piston, control cylinder and control cylinder chambers, respectively, of the ratio controller in FIG. 1. Thus, as seen in FIG. 4, depending on the adjusted ratio setting position of control valve member 164, either control cylinder chamber 145 or 146 is vented to produce axially shifting movement of the control cylinder 144, as indicated by arrow 224. The hydraulic fluid released from the vented control cylinder chamber is returned to sump 44 via fluid line 226.

Still referring to FIG. 4, port 190, communicating with low pressure internal shaft passage 114, is connected by fluid line 230 to a large energy storage accumulator 232 through a check valve 234, fluid line 235 and a spool valve 236. Similarly, port 191, communicating with high pressure internal shaft passage 112 (FIG. 2), is connected to accumulator 232 through a fluid line 237, a check valve 238, fluid line 235 and valve 236. The back-to-back check valves 234 and 238 ensure that only high pressure hydraulic fluid (as normal exists at port 191, but sporadically at port 190) is admitted to accumulator 232. As described in my cited U.S. application, a pressure relief valve 233, shown connected between shaft passages 112 and 114, ensures that the differential between the high and low pressure sides of the swashplate does not exceed design limits. In the illustrated centered valve position, fluid line 235 is disconnected from accumulator 232, and no hydraulic fluid flows into accumulator 232 to store energy. However, when the control valve is shifted to the right position, fluid line 235 is connected to the accumulator, and high pressure hydraulic fluid flows into the accumulator to store energy while transmission 10 is being driven by a prime mover, but particularly during vehicle deceleration. Then, when control valve 236 is shifted to the left position, the energy stored in accumulator 232 is returned to the pump and motor units via fluid line 240, fluid line 230 and port 190 for utilization to temporarily drive input shaft 14, output shaft 16, or both the input and output shafts depending upon swashplate angle.

Thus, the recovered stored energy may be utilized to drive the input shaft while the output shaft is braked and thus, for example, crank start an internal combustion engine connected as the transmission prime mover. On the other hand, the recovered energy may be used to drive the output shaft while the input shaft is braked and thus propel a vehicle over a short distance. Finally, the recovered energy may be utilized to apply torque to both the input and output shafts, supplementing the input torque applied to the input shaft by the prime mover.

Concluding the description of FIG. 4, as a transmission protective measure, a pressure relief valve 250 (not shown in FIG. 1) is incorporated in swashplate 22 between the high and low pressure sides of the swashplate in the manner disclosed in my cited U.S. application to prevent the pressure differential between the high and low pressure sides of the swashplate from exceeding design limits.

As mentioned earlier, thrust washer 49 and wear plate 50 in FIG. 1 provide a highly effective hydrostatic thrust bearing between the rotating hydraulic pump unit and housing 12 for handling the extreme thrust (axial) loadings developed in continuously variable hydrostatic transmission 10. As seen in the plan view of the thrust washer 49 in FIG. 5, the internal bore of the thrust washer is splined, as indicated at 48 in both FIGS. 1 and 5, for meshing engagement with splines 48 provided in the peripheral surface of radial flange 47 integral with input shaft 14, such that the thrust washer rotates at the input shaft speed. A circular array of tapped holes 260 are machined axially through the thrust washer 49 at uniformly circumferentially spaced locations. As illustrated at 62 in FIG. 1, the pump piston mounting bolts 61 are threaded into these tapped bores 260. Since the illustrated embodiment of the invention is equipped with ten pump pistons 58, the number of tapped holes 260 in thrust bearing 49 is also ten.

As seen in phantom in FIG. 1, a bore 262 is drilled through each pump piston mounting bolt 61 and therefore is in open communication with the hydraulic fluid in its associated pump cylinder 72. Returning to FIG. 5, ten sector-shaped cavities 264 (one seen in FIG. 1) are machined to a shallow depth in the bearing surface 265 of thrust washer 49 at uniform circumferential intervals, respectively corresponding to the locations of the tapped holes 260. As seen in FIG. 1, the openings of these cavities 264 at the thrust washer bearing surface are closed off by the planar bearing surface 266 of wear plate 50, which is keyed by pin 52 in the annular recess 51 formed in the radial surface of housing partition 34. It is seen that hydraulic fluid from the pump cylinders 72 can flow through the bores 62 in piston mounting bolt 61 to fill cavities 264. Consequently, during pumping operation of hydraulic pump unit 18, the fluid pressure of the hydraulic fluid in each pump cylinder 72 and the fluid pressure of the hydraulic fluid in the thrust washer cavity 264 in communication therewith through piston mounting bolt bore 262 are equal. It will be noted that the thrust forces acting on the pump pistons, resulting from the hydraulic fluid pressures in their respective pump cylinder 72, and the thrust forces acting on the thrust washer 49, resulting from the respective hydraulic fluid pressures in the cavities 264, are exerted in opposite axial directions. Consequently, by proportioning the cavity surface area to the pump piston head surface area, the net thrust forces at the sliding interface of the thrust washer and wearplate can be adjusted to desired magnitudes. In practice, the net thrust forces should not be so high that excessive friction exists at the sliding thrust washer/wearplate interface and yet not be so low that excessive hydraulic fluid leaks past the thrust washer/wearplate interface. However, limited leakage is necessary for lubrication of the thrust bearing interface surfaces. An optimum design therefore calls for a comprise between these contradictory factors, friction and leakage.

Figure 5:
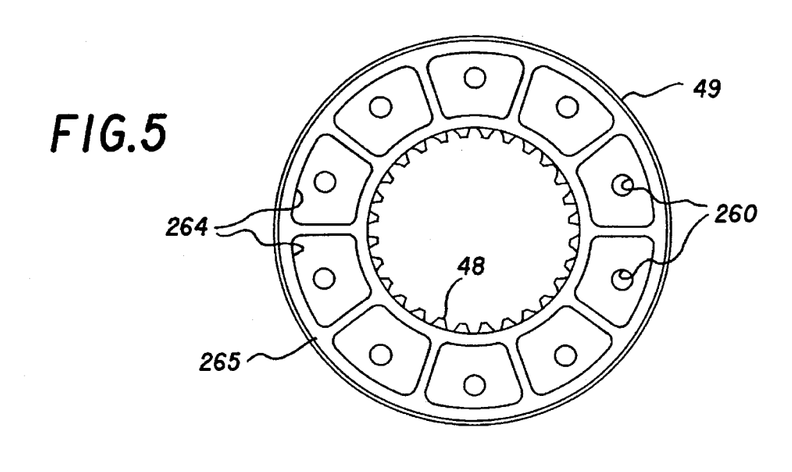
FIG. 5 is a plan view of a thrust washer included in a thrust bearing utilized in the transmission of FIG. 1.

I have found that by machining cavities 264 in the bearing surface of thrust washer 49 to a surface area of approximately 90% of the surface area of the pump piston heads, an optimum operating point is achieved, wherein both friction and leakage can be minimized.

From the foregoing description, it is seen that the present invention provides an infinitely variable hydrostatic transmission of the type disclosed in my cited U.S. application that affords advantages of compact size, fewer parts and reduced manufacturing costs. The provision of internal passages in the output shaft for separately handling low pressure and high pressure hydraulic fluids within the transmission housing simplifies manufacturing procedures. Involving the output shaft in the ratio controller design brings further economies, particularly in terms of saving space. The energy storage and recovery features of the present invention afford unique operating versatility.

It will be apparent to those skilled in the art that various modifications and variations can be made to the apparatus of the present invention without departing from the spirit of the invention. Thus it is intended that the present invention cover modifications and variations thereof, provided they come within the spirit of the appended claims and their equivalence.

What is claimed is:

1. A continuously variable hydrostatic transmission comprising:

a housing;

an input shaft journaled in the housing for receiving input torque from a prime mover;

an output shaft journaled in the housing for imparting output torque to a load and having an axis;

a pump unit coupled to the input shaft;

a motor unit grounded to the housing;

a swashplate including an input face confronting the pump unit, an output face confronting the motor unit and oriented at an acute angle relative to the input face, and a plurality of circumferentially spaced ports extending between the input and output faces;

a coupling drivingly connected to the output shaft and pivotally connected to the swashplate to accommodate both torque transfer between the swashplate and the output shaft and angular orientational adjustment of the swashplate relative to the output shaft axis;

a controller coupled to selectively angularly adjust the swashplate angular orientation to a desired transmission drive ratio between the input and output shafts; and an axially extending passage in one of the input and output shafts for introducing hydraulic fluid to the pump unit, when driven by the input shaft, the pump unit pumps hydraulic fluid to the motor unit through the swashplate ports, causing torque to be exerted on the swashplate to drive the output shaft.

2. The transmission defined in claim 1, wherein the shaft passage is provided in the output shaft, and the coupling includes an internal passage in hydraulic fluid flow communication with the shaft passage.

3. The transmission defined in claim 2, wherein the swashplate includes generally, diametrically opposed high pressure and low pressure sides, the coupling internal passage comprises a first internal passage segment communicating with the low pressure side of the swashplate and a second internal passage segment communicating with the high pressure side of the swashplate, and the output shaft includes an axially extending partition dividing the shaft passage into first and second axially extending shaft passages, the first shaft passage communicating with the first internal passage segment to supply low pressure hydraulic fluid to the pump unit at the low pressure side of the swashplate, and the second shaft passage communicating with the second internal passage segment to draw high pressure hydraulic fluid from the high pressure side of the swashplate.

4. The transmission defined in claim 3, wherein the output shaft includes a first radial port communicating with the first shaft passage and a second radial port communicating with the second shaft passage, the housing includes a first annular cavity communicating with the first port, an inlet port communicating with the first annular cavity, a second annular cavity communicating with the second port, and an outlet port communicating with the second annular cavity.

5. The transmission defined in claim 3, wherein the coupling includes diametrically opposed hubs extending radially outwardly from the output shaft, the swashplate further includes radially extending, diametrically opposed recesses, and the coupling further includes a separate hollow drive pink having opposed inner and outer open ends respectively received in adjacent ones of the hubs and the swashplate recesses, for drivingly and pivotally connect the swashplate to the output shaft, the first and second internal passage segments provided by the hollow drive pins.

6. The transmission defined in claim 5, further including a scavenge pump connected to supply low pressure hydraulic fluid to the inlet port, an energy accumulator, and a regenerative control valve having a first position connecting the accumulator to the outlet port to store energy and a second position connecting the accumulator to the inlet port to discharge stored energy for driving either or both of the input and output shafts depending upon swashplate angular orientation.

7. The transmission defined in claim 3, wherein the output shaft further includes an axially extending bore formed in the partition, and a valve positioned by the partition between the first and second internal passage segments for controlling flow of low pressure fluid into the bore to supply operating pressure for the controller.

8. The transmission defined in claim 7, wherein the output shaft further includes first and second axially spaced, radial holes extending through the partition into the bore, and the controller includes 1) an annular piston fixed on the output shaft at an axial position between the first and second holes, 2) an annular cylinder surrounding the output shaft and enclosing the annular piston to provide first and second annular chambers on opposite axial sides of the annular piston in respective communication with the first and second holes, 3) a control valve for selectively venting low pressure hydraulic fluid from one of the first and second annular chambers to produce axial motion of the annular cylinder, and 4) linkage for converting axial motion of the annular cylinder into angularly orientating pivotal motion of the swashplate.

9. The transmission defined in claim 8, wherein the controller linkage includes a sleeve slidingly mounted on the output shaft and having a first axial end attached to the annular cylinder and a second axial end, a radially extending tang having an inner end affixed to the second axial end of the sleeve and an outer end, and a pivot pin pivotally interconnecting the swashplate and the tang at a location outwardly from the tang inner end.

10. The transmission defined in claim 9, further including a balance ring affixed to the outer end of the tang.

11. A continuously variable hydrostatic transmission comprising:
a housing;
an input shaft journaled in the housing for receiving input torque from a prime mover;
an output shaft journaled in the housing for imparting output torque to a load and having an axis;
a hydraulic pump unit coupled to the input shaft;
a wedge-shaped swashplate including ports accommodating hydraulic fluid transfer between the hydraulic pump unit and the hydraulic motor unit;
a coupling drivingly connected to the output shaft and pivotally connected to the swashplate to accommodate torque transfer between the swashplate and the output shaft and angular movement of the swashplate about a first transverse pivot axis in orthogonal, intersecting relation with the output shaft axis; and
a transmission ratio controller including 1) an actuating member mounted for sliding axial motion on the output shaft, 2) a control sleeve closely surrounding the output shaft and having a first axial end connected to the actuating member and a second axial end, 3) a radially extending tang having an inner end connected to the second axial end of the sleeve, and 4) a pin interconnecting the swashplate and the tang at a second transverse pivot axis parallel to and radially spaced from the first traverse pivot axis, such that axial motion of the actuating member is converted to transmission ratio-changing pivotal motion of the swashplate about the first transverse pivot axis.

12. The transmission defined in claim 11, wherein the ratio controller further includes an annular piston fixed on the output shaft, the actuating member being in the form of an annular cylinder surrounding the output shaft and enclosing the annular piston to provide first and second annular control chambers on opposite axial sides of the annular piston, means for filling the first and second control chambers with hydraulic fluid to equal fluid pressures, and a control valve for selectively venting hydraulic fluid from one of the first and second control chambers to produce axial motion of the annular cylinder.

13. The transmission defined in claim 12, wherein the means for filling the first and second annular chambers with hydraulic fluid includes a pair of radial holes in the output shaft at axial positions on opposite sides of the annular piston to provide respective fluid connections between the first and second annular chambers and a fluid passage within the output shaft containing pressurized hydraulic fluid.

14. A hydraulic machine comprising:
a housing;
an input shaft journaled in the housing;
a hydraulic pump unit driven by the input shaft, the pump unit including a cylinder and a piston for pressurizing hydraulic fluid in the cylinder; and
a hydrostatic thrust bearing including:
a first bearing member mounted by the housing and having a first bearing surface,
a second bearing member mounted by a moving part of the pump unit and having a second bearing surface in sliding contact with the first bearing surface at an interface,
at least one cavity formed in one of the first and second bearing surfaces at the interface, and
an opening into the cavity in fluid flow communication with the cylinder through which hydraulic fluid flows to fill the cavity and through which the hydraulic fluid in the cavity is pressurized from the pressurized hydraulic fluid in the cylinder to generate thrust forces proportional to a surface area of the cavity in opposition to thrust loadings generated by the machine.

15. The hydraulic machine defined in claim 14, wherein the pump unit further includes multiple sets of cylinders and pistons arranged in a first circular array, and the thrust bearing further includes multiple cavities formed in the second bearing surface arranged in a second circular array corresponding to the first circular array, and separate openings into the cavities in respective flow communication with the cylinders.

16. The hydraulic machine defined in claim 15, wherein the moving part is a rotating carrier for the multiple cylinders and piston sets.

17. The hydraulic machine defined in claim 16, wherein the pump unit further includes a separate fastener affixing the piston of each set to the carrier, the fasteners having through-bores providing separate fluid communications between the cylinders and the cavity openings.

18. The hydraulic machine defined in claim 17, wherein the piston fasteners are in the form of bolts, and the openings are in the form of tapped holes into which the bolts are threaded.

19. The hydraulic machine defined in claim 14, wherein the surface area of the cavity is in the order of 90% of an area of a face surface of the piston.

20. A hydraulic machine comprising:

a housing;

an input shaft journaled in the housing for receiving input torque from a prime mover;

an output shaft journaled in the housing for imparting torque to a load;

a hydraulic pump unit coupled to the input shaft;

a hydraulic motor unit grounded to the housing;

a wedge-shaped swashplate drivingly coupled to the output shaft and including ports extending between an input face confronting the pump unit and an output face confronting the motor unit;

a controller linked to the swashplate for adjusting the angular orientation of the swashplate relative to an axis of the output shaft;

a valve having an energy storing position and an energy recovery position; and a hydraulic fluid accumulator in hydraulic fluid flow communication with the pump and motor units through the valve for storing hydraulic energy during propulsion of the pump unit by the prime mover while the valve is in the energy storing position and for recovering hydraulic energy back to the pump and motor units while the valve is in the energy recovery position to drive one of the input shaft, the output shaft, and both the input and output shafts, depending upon swashplate angular orientation.

\* \* \* \* \*